US008409518B2

(12) United States Patent
Kim et al.

(10) Patent No.: US 8,409,518 B2
(45) Date of Patent: Apr. 2, 2013

(54) SULFUR TOLERANT PEROVSKITE SUPPORTED CATALYSTS

(75) Inventors: Chang H Kim, Rochester, MI (US); Wei Li, Troy, MI (US); Richard J. Blint, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 381 days.

(21) Appl. No.: 12/720,158

(22) Filed: Mar. 9, 2010

(65) Prior Publication Data

US 2010/0233045 A1 Sep. 16, 2010

Related U.S. Application Data

(60) Provisional application No. 61/160,538, filed on Mar. 16, 2009.

(51) Int. Cl.
| | | |
|---|---|---|
| B01D 50/00 | (2006.01) | |
| B01D 53/34 | (2006.01) | |
| B01J 29/04 | (2006.01) | |
| B01J 29/06 | (2006.01) | |
| B01J 20/00 | (2006.01) | |
| B01J 21/00 | (2006.01) | |
| B01J 23/00 | (2006.01) | |
| B01J 23/02 | (2006.01) | |
| B01J 23/06 | (2006.01) | |
| B01J 23/08 | (2006.01) | |
| B01J 23/10 | (2006.01) | |
| B01J 23/32 | (2006.01) | |
| B01J 23/40 | (2006.01) | |
| B01J 23/42 | (2006.01) | |
| B01J 23/44 | (2006.01) | |
| B01J 23/58 | (2006.01) | |

(52) U.S. Cl. ............ 422/177; 422/180; 502/65; 502/66; 502/73; 502/74; 502/87; 502/302; 502/303; 502/304; 502/324; 502/325; 502/326; 502/327; 502/328; 502/330; 502/333; 502/339; 502/340; 502/341; 502/355; 502/415; 502/439; 502/527.12; 502/527.13; 502/525

(58) Field of Classification Search ............ 502/30–304, 502/324–328, 330, 333, 339–341, 355, 415, 502/439, 527.12, 527.13, 525; 422/177, 422/180

See application file for complete search history.

(56) References Cited

U.S. PATENT DOCUMENTS 4,237,032 A * 12/1980 Evans et al. ................... 502/303
5,622,680 A * 4/1997 Monceaux et al. ........ 423/213.5

(Continued)

OTHER PUBLICATIONS

Zhu et al., The Reaction and Poisoning Mechanism of SO2 and Perovskite LaCoO3 Film Model Catalysts; Applied Catalysis A: General 209 (2001) pp. 71-77.

(Continued)

*Primary Examiner* — Cam N. Nguyen
(74) *Attorney, Agent, or Firm* — BrooksGroup (57) ABSTRACT

A sulfur tolerant oxidation catalyst with appreciable NO and HC oxidation capabilities has been developed for use in any component of an exhaust aftertreatment system for a lean-burn engine where the oxidation of at least NO is desired. Several non-exclusive examples of such components where the oxidation catalyst may be employed include a DOC and a LNT. The oxidation catalyst may comprise perovskite oxide particles that support palladium particles. The ability of the palladium supported perovskite oxide particles to concurrently oxidize NO and HC's can significantly diminish or altogether eliminate the use of platinum in the exhaust aftertreatment system for at least NO oxidation. The oxidation catalyst, moreover, may exhibit superior thermal durability and better NO and HC oxidation activities than platinum in some instances.

19 Claims, 6 Drawing Sheets

U.S. PATENT DOCUMENTS

| | | | | |
|---|---|---|---|---|
| 5,977,017 A * | 11/1999 | Golden | | 502/302 |
| 5,990,038 A * | 11/1999 | Suga et al. | | 502/303 |
| 6,060,420 A * | 5/2000 | Munakata et al. | | 502/302 |
| 6,107,239 A * | 8/2000 | Qin et al. | | 502/300 |
| 6,352,955 B1 * | 3/2002 | Golden | | 502/302 |
| 6,372,686 B1 * | 4/2002 | Golden | | 502/302 |
| 6,395,675 B1 * | 5/2002 | Suga et al. | | 502/326 |
| 6,531,425 B2 * | 3/2003 | Golden | | 502/302 |
| 6,569,803 B2 * | 5/2003 | Takeuchi | | 502/328 |
| 7,071,141 B2 * | 7/2006 | Gandhi et al. | | 502/302 |
| 7,199,079 B2 * | 4/2007 | Matsuo et al. | | 502/333 |
| 7,205,259 B2 * | 4/2007 | Soerens | | 502/407 |
| 7,297,656 B2 * | 11/2007 | Zhang et al. | | 502/339 |
| 7,338,917 B2 * | 3/2008 | Matsuo et al. | | 502/330 |
| 7,375,054 B2 * | 5/2008 | Eguchi et al. | | 502/330 |
| 7,381,394 B2 * | 6/2008 | Tanaka et al. | | 423/593.1 |
| 7,407,911 B2 * | 8/2008 | Yeo | | 502/304 |
| 7,446,070 B2 * | 11/2008 | Hori et al. | | 502/60 |
| 7,476,640 B2 * | 1/2009 | Matsuo et al. | | 502/333 |
| 7,504,085 B2 * | 3/2009 | Yang | | 423/600 |
| 7,514,055 B2 * | 4/2009 | Golden | | 423/213.2 |
| 7,572,543 B2 * | 8/2009 | Mei et al. | | 429/483 |
| 7,572,751 B2 * | 8/2009 | Isogai et al. | | 502/302 |
| 7,576,032 B2 * | 8/2009 | Tanaka et al. | | 502/340 |
| 7,601,325 B2 * | 10/2009 | Tanaka et al. | | 423/593.1 |
| 7,622,418 B2 * | 11/2009 | Tanaka et al. | | 502/325 |
| 7,641,875 B1 * | 1/2010 | Golden | | 423/213.5 |
| 7,691,777 B2 * | 4/2010 | Isogai et al. | | 502/324 |
| 7,771,669 B2 * | 8/2010 | Chigapov et al. | | 422/177 |
| 7,795,170 B2 * | 9/2010 | Tanaka et al. | | 502/304 |
| 7,797,931 B2 * | 9/2010 | Dubkov et al. | | 60/299 |
| 7,811,690 B2 * | 10/2010 | Eickhoff | | 429/413 |
| 7,923,408 B2 * | 4/2011 | Takahashi et al. | | 502/327 |
| 8,158,550 B2 * | 4/2012 | Cimino et al. | | 502/302 |

OTHER PUBLICATIONS

Cheng et al., Stability of Materials as Candidates for Sulfur-Resistant Anodes of Solid Oxide Fuel Cells; Journal of the Electrochemical Society, 153 (7), 2006, pp. A1302-A1309.

Wang et al., Study on the Poisoning Mechanism of Sulfur Dioxide for Perovskite La0.9Sr0.1CoO3 Model Catalysts; Catalysis Letters, vol. 82, No. 3-4, Oct. 2002, pp. 199-204.

Alifanti et al., Activity in Methane Combustion and Sensitivity to Sulfur Poisoning of La1-xCexMn1-yCoyO3 Perovskite Oxides, Applied Catalysis B: Environmental 41 (2003), pp. 71-81.

Tanaka et al., Advances in Designing Perovskite Catalysts; Current Opinion in Solid State and Materials Science, vol. 5, 2001, pp. 381-387.

U.S. Appl. No. 12/571,606, filed Oct. 1, 2009, Washcoating Technique for Perovskite Catalyst, Chang H. Kim.

U.S. Appl. No. 12/563,345, filed Sep. 21, 2009, Method and Architecture for Oxidizing Nitric Oxide in Exhaust Gas From Hydrocarbon Fuel Source With a Fuel Lean Combustion Mixture, Chang H. Kim.

U.S. Appl. No. 12/713,803, filed Feb. 26, 2010, Perovskite-Type Compounds for Use in Lean NOx Traps, Wei Li.

* cited by examiner

SULFUR TOLERANT PEROVSKITE SUPPORTED CATALYSTS

CROSS-REFERENCES TO RELATED APPLICATIONS

This application claims the benefit of U.S. Provisional Application No. 61/160,538, filed on Mar. 16, 2009, the disclosure of which is hereby incorporated by reference in its entirety.

TECHNICAL FIELD

The technical field relates generally to exhaust aftertreatment systems and, more particularly, to sulfur tolerant perovskite supported oxidation catalysts.

BACKGROUND

A lean-burn engine may be supplied with a lean mixture of air and fuel (oxygen-rich mixture) as a means to improve vehicle fuel economy. The exhaust emitted from such engines during periods of lean-burn operation may include a relatively high content of oxygen ($O_2$), a relatively low content of carbon monoxide (CO) and unburned/partially-burned hydrocarbons (hereafter HC's), possibly some suspended particulate matter, and small amounts of nitrogen oxides primarily comprised of NO and $NO_2$ (collectively referred to as $NO_X$ gases). The $NO_X$ gas constituency of the exhaust may fluctuate between about 50 and 1500 ppm and may comprise greater than 90 wt. % NO and less than 10 wt. % $NO_2$. The hot engine exhaust, which can reach temperatures of up to about 900° C., often needs to be treated to decrease the concentration of some or all of these gaseous emissions before it is expelled to the atmosphere from the vehicle's tailpipe.

To this end, an exhaust aftertreatment system may be installed downstream of the lean-burn engine to control the various unwanted emissions and particulate matter contained in the engine's exhaust. A typical exhaust aftertreatment system usually aspires to cooperatively (1) oxidize CO into carbon dioxide ($CO_2$), (2) oxidize HC's into $CO_2$ and water ($H_2O$), (3) convert $NO_X$ gases into nitrogen ($N_2$) and $O_2$, and remove any other unwanted matter. Catalytic converters that employ platinum group metals (PGM's) largely comprised of platinum have long been used to address this need. But the nature of the exhaust produced during lean-burn engine operation poses certain challenges for traditional catalytic converters. One specific challenge is that the relatively high content of $O_2$ and the relatively low content of CO and HC's in the hot exhaust renders the reaction kinetics for the conversion of $NO_X$ gases to $N_2$ over PGM's quite unfavorable. The conversion of $NO_X$ gases into $N_2$ may nonetheless be accomplished by several known approaches.

A lean $NO_X$ trap, or LNT, is but one available option that may be employed. A LNT generally operates by feeding the exhaust expelled from the lean-burn engine across and/or through an LNT catalyst material that exhibits $NO_X$ gas trapping and conversion capabilities. The LNT catalyst material generally includes an oxidation catalyst, a $NO_X$ storage catalyst, and a $NO_X$ reduction catalyst. When the lean-burn engine is combusting a lean mixture of air and fuel, the oxidation catalyst oxidizes NO to $NO_2$ and the $NO_X$ storage catalyst traps or "stores" $NO_2$ as a nitrate species. The oxidation catalyst may also oxidize other gaseous emissions contained in the engine exhaust such as CO and HC's, if present. The $NO_X$ storage capacity of the LNT catalyst material, however, is not unlimited and at some point may need to be regenerated or purged of the $NO_X$-derived nitrate compounds. The LNT catalyst material may be regenerated, for example, by momentarily switching the mixture of air and fuel supplied to the lean-burn engine from lean to rich. The resultant delivery of rich-burn exhaust effluents to the LNT catalyst material causes the $NO_X$-derived nitrate compounds to become thermodynamically unstable which, in turn, triggers the release of $NO_X$ gases and the regeneration future $NO_X$ storage sites. The liberated $NO_X$ gases are then reduced, largely to $N_2$, by the excess reductants—such as CO, HC's and/or $H_2$—present in the rich-burn engine effluents over the $NO_X$ reduction catalyst.

Another option that may be employed in the exhaust aftertreatment system to convert $NO_X$ gases to $N_2$ is a urea/ammonia selective catalyst reduction system (urea-SCR). A urea-SCR system injects urea from an on-board and refillable urea storage tank into the exhaust expelled from the lean-burn engine. The urea decomposes in the oxygen-rich exhaust to form ammonia ($NH_3$) which, in turn, selectively reduces the $NO_X$ gases to $N_2$ and $H_2O$ in the presence of $O_2$ over a catalyst material specific to that reaction. Ammonia may also be directly injected into the exhaust to accomplish the same result if desired.

A diesel oxidation catalyst (DOC) may be located upstream from the LNT or urea/ammonia-SCR system to oxidize as much of the NO (to $NO_2$) and residual CO and HC's (to $CO_2$ and $H_2O$) contained in the engine's exhaust as possible. The initial oxidative impact of the DOC may be quite helpful since both LNT's and urea/ammonia systems generally convert $NO_X$ gases to $N_2$ more efficiently as the ratio of NO to $NO_2$ in the total $NO_X$ gas emission decreases to about 1:1 or lower. The early oxidation of CO and HC's may also help drive the conversion of $NO_X$ gases to $N_2$ since the presence of these and other reductants can promote the partial decomposition of $NO_2$ back into NO. The DOC may include a DOC catalyst material similar in composition to the LNT catalyst material except that it generally does not include a $NO_X$ storage or a $NO_X$ reduction catalyst.

Both the DOC catalyst material and the LNT catalyst material have conventionally been equipped with a refractory metal oxide on which the oxidation catalyst, generally platinum, is dispersed to oxidize NO, CO, and HC's. But the use of platinum in conventional DOCs and LNTs, especially the relatively large amounts that are normally employed to oxidize NO to $NO_2$, is rather expensive. Platinum has also been shown, in some instances, to exhibit poor thermal durability and to lose some catalytic activity when exposed to engine exhaust at higher operating temperatures.

Conventional DOC and LNT catalyst materials, moreover, have demonstrated a general susceptibility to sulfur poisoning when the lean-burn engine combusts a sulfur-containing fuel such as a diesel fuel. The sulfur content of many diesel fuels is typically about 50 ppm or less and, for some ultra-low sulfur diesel fuels, about 10 ppm or less. This small amount of sulfur is oxidized mostly to $SO_2$ when the sulfur-containing fuel is combusted. The $SO_2$ may be further oxidized to $SO_3$ when exposed to platinum or some other oxidation catalyst. The $SO_3$ may then form particulates containing sulfuric acid when exposed to water vapor in the engine's exhaust. The $SO_2$, $SO_3$, and sulfuric acid-containing particulates may chemisorb as sulfur species including various sulfates and sulfites onto the platinum and other catalysts (PGM's, $NO_X$ storage catalysts, etc.) that may be contained in the DOC and the LNT catalyst materials. The relatively strong metal-sulfur bonds formed through such chemisorption enables the deposited sulfur species to block active catalytic sites and progressively diminish the catalytic conversion efficiency of the DOC and/or LNT. Several "deSO$_X$" approaches have been developed that can help remove the deposited sulfur species from the DOC and/or LNT catalyst materials. But these approaches are often cumbersome and tend to penalize the fuel economy of the lean-burn engine.

The need for innovative developments that can help improve the operation and efficiency of exhaust aftertreatment systems for lean-burn engines, as well as other related fields of technological art, is thus prevalent and ongoing.

SUMMARY OF EXEMPLARY EMBODIMENTS

A sulfur tolerant oxidation catalyst that exhibits appreciable NO and HC oxidation capabilities has been developed. The oxidation catalyst may comprise perovskite oxide particles that support palladium particles. The oxidation catalyst may be used in any component of an exhaust aftertreatment system where at least NO contained in an exhaust emitted from a lean-burn engine is sought to be oxidized.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

A sulfur tolerant oxidation catalyst with appreciable NO and HC oxidation capabilities has been developed for use in any component of an exhaust aftertreatment system for a lean-burn engine where the oxidation of at least NO is desired. Several non-exclusive examples of such components where the oxidation catalyst may be employed include a DOC and a LNT. The oxidation catalyst may comprise perovskite oxide particles that support palladium particles. The perovskite oxide particles may be comprised of a single perovskite oxide or a mixture of two or more perovskite oxides. The palladium particles may be supported on the perovskite oxide particles at a weight percent ranging from about 0.5 to about 5.0 based on the weight of the oxidation catalyst. The ability of the palladium supported perovskite oxide particles to concurrently oxidize NO and HC's can significantly diminish or altogether eliminate the need to use platinum in the exhaust aftertreatment system for at least NO oxidation. The oxidation catalyst, moreover, may exhibit superior thermal durability and better NO and HC oxidation activities than platinum in some instances.

Figure 1A:
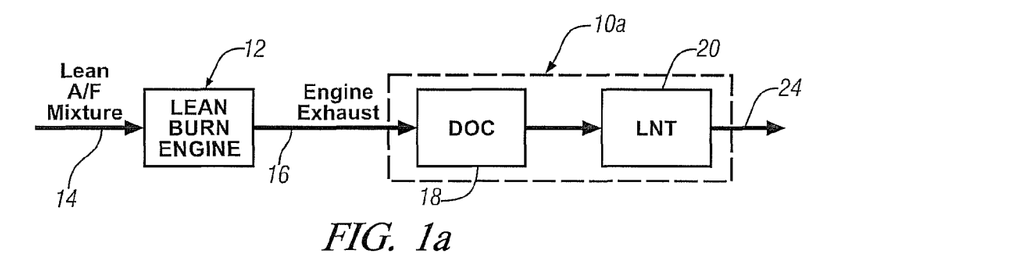
FIG. 1a is a schematic illustration of a lean-burn engine and some relevant parts of an exhaust aftertreatment system located downstream of the lean-burn engine according to one embodiment of the invention.
Figure 1B:
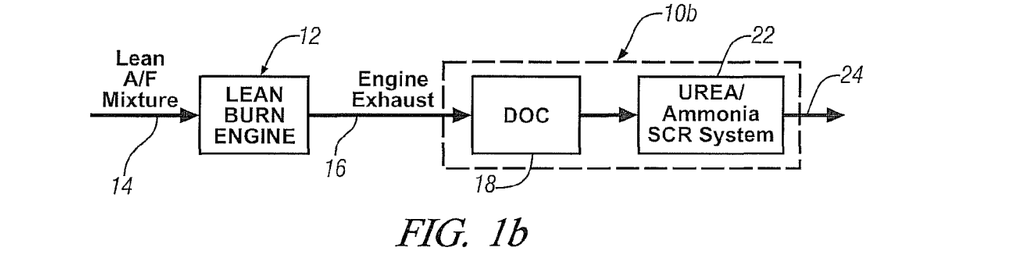
FIG. 1b is a schematic illustration of a lean-burn engine and some relevant parts of an exhaust aftertreatment system located downstream of the lean-burn engine according to one embodiment of the invention.

FIGS. 1a-1b depict schematic illustrations of several exemplary embodiments of the relevant components of an exhaust aftertreatment system 10a, 10b for a vehicle powered by a lean-burn engine 12. These disclosed embodiments are well understood by skilled artisans and, as such, a detailed explanation of their overall operation and the operation and construction of their many components is generally not necessary. A brief discussion of the exhaust aftertreatment systems 10a, 10b shown in FIGS. 1a-1b is nonetheless provided here.

The lean-burn engine 12 may be any engine that is constructed to receive and combust, at least some of the time, a lean mixture of air and fuel 14 (hereafter "lean A/F mixture"). Some particular examples of engines that may be employed as the lean-burn engine 12 include, but are not limited to, a diesel engine, a spark ignition direct injection engine (SIDI), and a homogeneous charge compression ignition engine (HCCI). The general construction and functionality of these types of engines are known to skilled artisans and, as a result, need not be discussed in detail here. Other known engine types that are designed and/or constructed to operate in a lean-burn state may also be used.

The lean A/F mixture 14 fed to the lean-burn engine 12 generally contains more air than is stoichiometrically necessary to combust the associated fuel. For instance, the air to fuel mass ratio of the lean A/F mixture 14 may be greater than 14.6-14.8, which is the approximate stoichiometric air/fuel mass ratio range of many gasoline and diesel fuels. Indeed, in many instances, the air to fuel mass ratio of the lean A/F mixture 14 usually lies somewhere in the range of about 20-65 depending on the operating demands of the vehicle. Combustion of the lean A/F mixture 14 produces energy for powering the vehicle and an engine exhaust 16 that is ultimately expelled from the lean-burn engine 12. The engine exhaust 16 generated from the combustion of the lean A/F mixture 14 can reach temperatures of up to about 900° C. and generally comprises $O_2$, $CO_2$, CO, HC's, $NO_X$ gases, possibly some particulate matter, and the balance nitrogen and water when the fuel is gasoline or diesel fuel. The $NO_X$ gas constituency of the engine exhaust 16 may fluctuate between about 50 and about 1500 ppm and typically comprises greater than 90 wt. % NO and less than 10 wt. % $NO_2$. The $O_2$ content, which is relatively high, and the CO and HC's content, which are relatively low, promote an oxidizing environment in the engine exhaust 16.

The exhaust aftertreatment system 10a, 10b receives the engine exhaust 16 from the lean-burn engine 12, removes unwanted gaseous emissions including $NO_X$ gases from the engine exhaust 16, and communicates a treated exhaust 24 towards the vehicle's tailpipe (not shown) for eventual expulsion to the atmosphere. The exhaust aftertreatment system 10a, 10b may include a DOC 18 and at least one of a LNT 20, as shown in FIG. 1a, or a urea/ammonia SCR system 22, as shown in FIG. 1b, located downstream from the DOC 18. A variety of other components, while not expressly shown in FIGS. 1a-1b, may also be included in the exhaust aftertreatment system 10a, 10b to help remove the unwanted gaseous emissions and/or any suspended particulate matter if desired. These components include, for example, a TWC-based catalytic converter and/or a diesel particulate filter. Other components may also be located upstream or downstream of the exhaust aftertreatment system 10a, 10b. An exhaust gas recirculation line may, for example, recirculate a portion of the engine exhaust 16 in known fashion to help lower the $NO_X$ gas emission from the lean-burn engine 12. As another example, at least a portion of the engine exhaust 16 may be directed through a turbocharger turbine to increase the intake pressure of the air supplied to the lean-burn engine 12. Skilled artisans will undoubtedly be aware of and understand these and the many other components that may be included in and around the engine aftertreatment system 10a, 10b.

The DOC 18 may be close coupled to the lean-burn engine 12 and configured to receive the engine exhaust 16. The DOC 18 may include a DOC catalyst material that seeks to oxidize as much of the NO (to $NO_2$) and residual CO and HC's (to $CO_2$ and $H_2O$) contained in the engine exhaust 16 as possible. The engine exhaust 16, depending on the design of the exhaust aftertreatment system 10a, 10b, may then be fed to either the LNT 20 or the urea/ammonia-SCR system 22 for removal of the $NO_X$ gas emission (NO and $NO_2$) from the engine exhaust 16. The oxidative impact of the DOC 18 may be quite helpful since both the LNT 20 and the urea/ammonia-SCR system 22 generally convert $NO_X$ gases to $N_2$ more efficiently as the ratio of NO to $NO_2$ in the total $NO_X$ gas emission from the lean-burn engine decreases to about 1:1 or lower. The early oxidation of CO and HC's may also help drive the conversion of $NO_X$ gases to $N_2$ in the LNT 20 and the urea/ammonia-SCR system 22 since the presence of these and other reductants can promote the partial decomposition of $NO_2$ back into NO.

The LNT 20, if employed, may include a LNT catalyst material that exhibits $NO_2$ trapping and $NO_X$ gas conversion capabilities. When the lean-burn engine 12 is combusting the lean NF mixture 14, the catalyst oxidizes NO to $NO_2$ and traps or "stores" $NO_2$ as a nitrate species. The catalyst material may also oxidize other gaseous emissions contained in the engine exhaust 16 such as CO and HC's, if present. The $NO_X$ storage capacity of the LNT catalyst material, however, is not unlimited and at some point may need to be regenerated or purged of the $NO_X$-derived nitrate compounds. The LNT catalyst material may be regenerated by introducing excess reductants—such as CO, HC's and $H_2$—into the engine exhaust 16. This is usually accomplished by momentarily combusting a rich mixture of air and fuel in the lean-burn engine 12 as opposed to the lean NF mixture 14. The resultant delivery of rich-burn exhaust effluents to the LNT catalyst material by way of the engine exhaust 16 causes the $NO_X$-derived nitrate compounds to become thermodynamically unstable which, in turn, triggers the release of $NO_X$ gases and the regeneration of future $NO_X$ storage sites. The liberated $NO_X$ gases are then reduced by the excess reductants, largely to $N_2$, which is then communicated from the exhaust aftertreatment system 10 in the treated exhaust 24.

The urea/ammonia-SCR system 22, if employed, may include a mechanism to inject urea into the engine exhaust 16 and a selective reduction catalyst (SCR) that facilitates an ammonia/$NO_X$ gas reaction. The injected urea decomposes in the hot, oxygen-rich engine exhaust 16 to form ammonia ($NH_3$). The $NH_3$ then reduces the $NO_X$ gases, largely to $N_2$ and $H_2O$, in the presence of $O_2$ over the SCR. The newly-generated $N_2$ is eventually communicated from the exhaust aftertreatment system 10 in the treated exhaust 24. Ammonia may also be directly injected into the engine exhaust 16 to accomplish the same result if desired.

Figure 2:
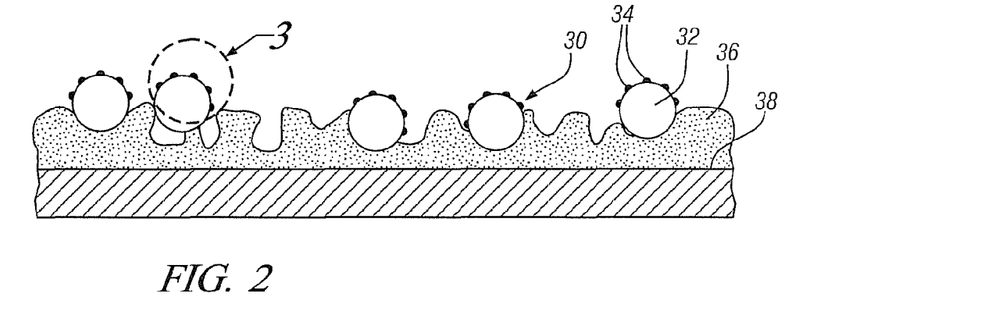
FIG. 2 is an idealized illustration of an oxidation catalyst dispersed on an optional carrier material that may be employed in an exhaust aftertreatment system for a lean-burn engine.
Figure 3:
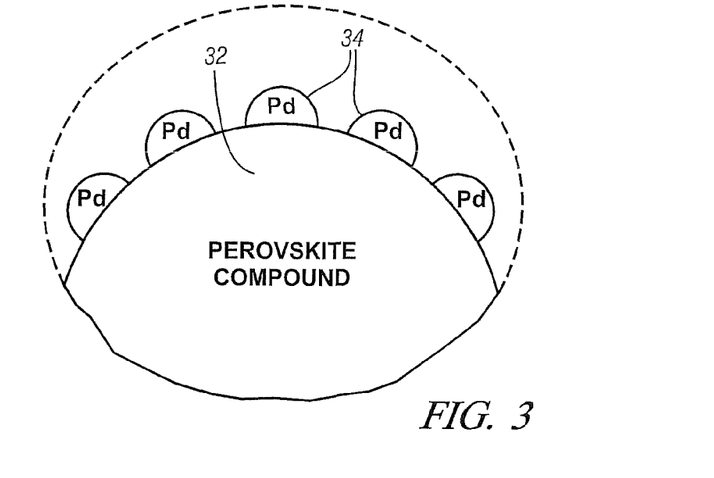
FIG. 3 is an idealized partial magnified view of palladium particles supported on a perovskite oxide particle of the oxidation catalyst shown in FIG. 2.

An idealized illustration of a sulfur tolerant oxidation catalyst 30 that may be employed in any component of the exhaust aftertreatment system 10a, 10b where at least the oxidation of NO is desired (i.e., the DOC 18 and/or the LNT 20) is shown in FIGS. 2-3. The oxidation catalyst 30 may include perovskite oxide particles 32 that support palladium particles 34. The NO and HC oxidative capabilities of the oxidation catalyst 30 are comparable, and in some instances better, than that of conventional platinum-based catalyst materials. The perovskite oxide particles 32 are generally responsible for oxidizing NO and the supported palladium particles 34 are generally responsible for oxidizing light and heavy HC's. The presence of the palladium particles 34 on the surface of the perovskite oxide particles 34 also defends against the deposition of sulfur species on the oxidation catalyst 30 when the lean-burn engine 12 is combusting a sulfur-containing fuel. The oxidation catalyst 30, moreover, exhibits a relatively high thermal durability that is generally not achievable by conventional platinum-based oxidation catalysts. The oxidation catalyst 30 can, for instance, function as intended in the oxidizing environment of the engine exhaust 16 at temperatures of at least 750° C.

The perovskite oxide particles 32 may be comprised of one or more perovskite oxides defined by the general formula $ABO_3$ or $Al_xA2_{1-x}BO_3$ where $X \leq 1$. The "A" and "B" may be complimentary cations of different sizes that coordinate with oxygen anions. A unit cell of the $ABO_3$ and $Al_xA2_{1-x}BO_3$ crystal structures may feature a cubic closest packing arrangement with the "A" cation, which is generally the larger of the two cations, centrally located and surrounded by eight "B" cations situated in the octahedral voids of the packing arrangement. The "A" and "B" cations in such a packing arrangement respectively coordinate with twelve and six oxygen anions. The unit cell of the $ABO_3$ and $Al_xA2_{1-x}BO_3$ crystal structures, however, is not necessarily limited to a cubic closest packing arrangement. Certain combinations of the "A" and "B" cations may indeed deviate from the cubic closest packing arrangement and assume, for instance, an orthorhombic, rhombohedral, or monoclinic packing structure.

The perovskite oxide particles 32 may be comprised of a single perovskite oxide or a mixture of two or more perovskite oxides. A great many combinations of perovskite oxides are available for use in the oxidation catalyst 30 since no fewer than 27 cations may be employed as the "A" cation and no fewer than 36 cations may be employed as the "B" cation. A listing of the cations most frequently employed as the "A" cation includes those of calcium (Ca), strontium (Sr), barium (Ba), bismuth (Bi), cadmium (Cd), cerium (Ce), lead (Pb), yttrium (Y), and lanthanum (La) while a listing of the cations most commonly employed as the "B" cation includes those of cobalt (Co), titanium (Ti), zirconium (Zr), niobium (Nb), tin (Sn), cerium (Ce), aluminum (Al), nickel (Ni), chromium (Cr), manganese (Mn), copper (Cu), and iron (Fe). Some specific and exemplary perovskite oxides that may constitute all or part of the perovskite oxide particles 32 include $LaCoO_3$, $La_{0.9}Sr_{0.1}CoO_3$, $LaMnO_3$, and $La_{0.9}Sr_{0.1}MnO_3$.

The perovskite oxide particles 32 can catalytically oxidize NO to $NO_2$ when exposed to the engine exhaust 16 just as efficiently as platinum. While not wishing to be bound by theory, it is believed that the perovskite oxide particles 32 donate oxygen anions to NO molecules to enable the formation of $NO_2$ while temporarily forming oxygen vacancies in their crystal structure. Oxygen contained in the engine exhaust 16 then disassociates to fill those oxygen vacancies and possibly oxidize additional NO molecules. The ability of the perovskite oxide particles 32 to efficiently oxidize NO to $NO_2$ may significantly diminish or altogether eliminate the need to utilize platinum in the DOC 18, the LNT 20, or anywhere else in exhaust aftertreatment system 10 where NO is sought to be oxidized. The exhaust aftertreatment system 10a, 10b may, as a result, include only trace amounts of platinum or no platinum at all.

The palladium particles 34 may be supported on the perovskite oxide particles 32 at a weight percent ranging from about 0.5 to about 5.0 based on the weight of the oxidation catalyst 30. The technique used to load the palladium particles 34 onto the surface of the perovskite oxide particles 32 may be any known technique such as, but not limited to, wet impregnation. The palladium particles 34 supported on the perovskite oxide particles 32, as mentioned before, are generally responsible for the HC oxidation capabilities of the oxidation catalyst 30 and also help protect the oxidation catalyst 30 against sulfur poisoning. The oxidation catalyst 30, for example, can achieve light-off temperatures below 250° C. for several HC's—namely, $C_3H_8$ and $C_3H_6$. Such light-off temperatures are generally not attainable by a perovskite oxide alone. The oxidation catalyst 30 can also maintain its catalytic activity for NO and HC's when the lean-burn engine 12 is combusting a sulfur-containing fuel for longer periods than a perovskite oxide alone. It is believed that the palladium particles 34 interfere with the chemisorption of sulfur species on the oxidation catalyst 30 and, as a result, can help guard against sulfur poisoning and the associated the loss of catalytic efficiency.

The oxidation catalyst 30 may be included in the DOC 18, the LNT 20, and/or any other component in the exhaust aftertreatment system 10a, 10b where at least the oxidation of NO is desired. For example, as shown in FIG. 2, the oxidation catalyst 30 may be carried by a substrate surface 38. The substrate surface 38 may be any surface over which at least a portion of the engine exhaust 16 passes while traversing the DOC 18, the LNT 20, or any other component that seeks to oxidize at least NO. The substrate surface 38 may, for example, be a wall surface that defines one of the hundreds of flow-through cells within a monolithic honeycomb structure that may be used as a support structure in the DOC 18 and/or the LNT 20 to ensure high exhaust/catalyst interaction, an exterior surface of a packing bead that is part of a catalytic packed bed which may be included in the DOC 18 and/or the LNT 20, or any other surface that may be exposed to the engine exhaust 16 at a juncture where oxidation of at least NO is desired. The substrate surface 38 may formed from a ceramic, such as cordierite or silicon carbide, or other material capable of withstanding the potentially high temperatures often associated with the engine exhaust 16. Skilled artisans will undoubtedly know of the many available surfaces and their locations in the engine exhaust aftertreatment system 10a, 10b that are represented by the substrate surface 38 in FIG. 2.

An optional carrier material 36 may be washcoated onto the substrate surface 38 and may exhibit a relatively high surface area with many loading or dispersion sites for accommodating the oxidation catalyst 30, if desired. The surface area of the carrier material 36 may range, for example, from about 20 m$^2$/gram to about 300 m$^2$/gram. The carrier material 36 may be present in an amount that ranges from about 50 to about 300 grams per liter of volume through which the engine exhaust 16 flows in the presence of the oxidation catalyst 30. The loading of the carrier material 36, however, may vary beyond those limits depending on the specific composition of the carrier material 36, the amount of the oxidation catalyst 30 present on the carrier material 36, the particular perovskite oxides used as the perovskite oxide particles 32, and whether or not other catalysts are dispersed on the carrier material 36, to name but a few potentially relevant factors. A non-exclusive listing of some materials that may be used to construct the carrier material 36 includes a mixed cerium and zirconium oxide material ($CeO_2$—$ZrO_2$), alumina ($Al_2O_3$), a zeolite, or a combination of one or more of those materials. In the absence of the carrier material 36, the oxidation catalyst 30 may be directly applied to the substrate surface 38 by washcoating or some other appropriate deposition technique.

The amount of the oxidation catalyst 30 that may be carried by the substrate surface 38, with or without the carrier material 36, may vary but generally ranges from about 50 to 200 and more specifically from about 100 to 150 grams per liter of volume through which the engine exhaust 16 flows in the presence of the oxidation catalyst 30. Put differently, about 50 to about 200 grams of the oxidation catalyst 30 may be present for every liter of volume available for communicating the engine exhaust 16 over the oxidation catalyst 30. Greater or smaller amounts of the oxidation catalyst 30 may of course be employed depending on, for example, the particular catalytic demands of the component(s) and/or the normal expected NO and HC emissions from the lean-burn engine 12.

Other materials may also be carried by the substrate surface 38 although not expressly shown in FIG. 2. These materials may be dispersed on the carrier material 36, if present, or they may be directly applied to the substrate surface 38. A $NO_x$ storage catalyst, such as BaO and/or $K_2CO_3$, and a $NO_x$ reduction catalyst, such as rhodium, may be present if the substrate surface 38 is located in the LNT 20. Free-standing Palladium (not supported by the perovskite oxide particles 32) may also be present to help oxidize any residual HC's and CO present in the engine exhaust 16 if the substrate surface 38 is located in either of the DOC 18 or the LNT 20, or both. Skilled artisans will be capable of determining the appropriate loading amounts of these materials through experience and/or routine testing.

EXAMPLE

This Example seeks to demonstrate the performance capabilities of the oxidation catalyst 30 described above. The oxidation catalyst 30 utilized here, which is but one specific and exemplary embodiment, is comprised of $Pd/La_{0.9}Sr_{0.1}CoO_3$. The oxidation performance and sulfur tolerance of this oxidation catalyst is demonstrated by comparing it against several perovskites without supported palladium particles ($La_{0.9}Sr_{0.1}CoO_3$ and $LaCoO_3$) and a conventional platinum-based DOC catalyst material. The oxidation catalyst was evaluated alone and together with free-standing palladium (not supported by the $La_{0.9}Sr_{0.1}CoO_3$) in an attempt to replicate a workable DOC catalyst material that includes $Pd/La_{0.9}Sr_{0.1}CoO_3$ as a replacement for platinum.

1. Preparation of $Pd/La_{0.9}Sr_{0.1}CoO_3$

A quantity of $La_{0.9}Sr_{0.1}CoO_3$ was prepared by a citric acid method. First, appropriate amounts of $La(NO_3)_3 \cdot 6H_2O$, 50% $Co(NO_3)_2$ solution, and $S(NO_3)_2$ were dissolved in distilled water with citric acid monohydrate. Citric acid was then added to the solution in 10 wt. % excess to ensure complete complexation of the metal ions. The solution was stirred for 1 hour at room temperature. Next, the solution was heated to 80° C. under continuous stirring to slowly evaporate the water until the solution became a viscous gel and started evolving $NO/NO_2$ gases. The resulting spongy material was crushed and calcined at 700° C. for about 5 hours in static air to form the perovskite oxide ($La_{0.9}Sr_{0.1}CoO_3$).

Next, the $La_{0.9}Sr_{0.1}CoO_3$ was ball milled with 6.33 mL of water per gram of $La_{0.9}Sr_{0.1}CoO_3$ for 24 hours. The solution was then stirred continuously as 0.33 mL of 0.1 M $HNO_3$ per gram of $La_{0.9}Sr_{0.1}CoO_3$ and 5 mL of water per gram of $La_{0.9}Sr_{0.1}CoO_3$ were added to form a slurry of the $La_{0.9}Sr_{0.1}CoO_3$. The concentration of the $La_{0.9}Sr_{0.1}CoO_3$ in the resultant slurry was 0.114 g/mL.

A plurality of monolithic honeycomb core samples were then dip-coated in the $La_{0.9}Sr_{0.1}CoO_3$ slurry. The excess liquid was removed by an air knife. The core samples had a length of 1 inch, a diameter of 0.75 inches, and a flow-through cell density of about 400 flow-through cells per square inch with each cell having a wall thickness of about 0.004 inches. The coated core samples were then placed horizontally in an oven set at 200° C. for 30 minutes. This procedure was repeated until the loading of $La_{0.9}Sr_{0.1}CoO_3$ reached approximately 100-120 grams per liter of volume of the core samples available for gas transport over the $La_{0.9}Sr_{0.1}CoO_3$. After this loading was achieved, the $La_{0.9}Sr_{0.1}CoO_3$ was calcined at 700° C. for 5 hours with an air flow of 100 mL/minute.

Palladium particles were then loaded onto the surface of the $La_{0.9}Sr_{0.1}CoO_3$ by a conventional wet impregnation method to form the $Pd/La_{0.9}Sr_{0.1}CoO_3$. In this method, an appropriate amount of $Pd(NO_3)_2$ was first dissolved in a controlled quantity of water. The core samples were then exposed to this solution, which was kept at 60° C. for 2 hours with occasional stirring. Afterwards, the core samples were collected and dried to remove any residual water. The excess solution was discarded. The solid $Pd/La_{0.9}Sr_{0.1}CoO_3$ material was then calcined in air at 500° C. for about 5 hours. The nominal loading of Pd on the $La_{0.9}Sr_{0.1}CoO_3$ was about 1.5 weight % based on the total weight of the $Pd/La_{0.9}Sr_{0.1}CoO_3$.

Each of the monolithic core samples was then hydrothermally pretreated in an oven at 750° C. with 10 mol % $H_2O$ in air for about 72 hours.

2. Preparation of $La_{0.9}Sr_{0.1}CoO_3$

Monolithic honeycomb cores samples of the same kind that included $La_{0.9}Sr_{0.1}CoO_3$ were prepared by the same procedure as that described with respect to $Pd/La_{0.9}Sr_{0.1}CoO_3$ except that the wet impregnation of palladium particles was omitted.

3. Preparation of $LaCoO_3$

Monolithic honeycomb core samples of the same kind that included $LaCoO_3$ were prepared by the same procedure as that described with respect to $Pd/La_{0.9}Sr_{0.1}CoO_3$ except that $Sr(NO_3)_2$ was not used in the citric acid method to form the perovskite oxide and, further, the wet impregnation of palladium particles was omitted.

4. Preparation of the Conventional Platinum-based DOC Catalyst Material

Monolithic honeycomb core samples of the same kind that included the conventional platinum-based DOC catalyst material were also prepared. The conventional platinum-based DOC catalyst material was obtained from BASF and contained a PGM catalyst loading of 1.72 g/L (1.51 g Pt/0.21 g Pd) where the measurement of L, like before, refers to the total flow-through volume available for gas transport through the core sample over the DOC catalyst material.

5. Preparation of the Replica DOC Catalyst Material Including $Pd/La_{0.9}Sr_{0.1}CoO_3$ Monolithic honeycomb core samples of the same kind that included the $Pd/La_{0.9}Sr_{0.1}CoO_3$ dispersed on an $Al_2O_3$ carrier material along with free-standing palladium in an attempt to replicate a workable DOC catalyst material that includes $Pd/La_{0.9}Sr_{0.1}CoO_3$ as a replacement for platinum were also prepared. To prepare these core samples, a quantity of $Al_2O_3$ loaded with Pd was first prepared by a conventional incipient wetness impregnation method. Pursuant to this method, $Pd(NO_3)_2$ was impregnated onto $Al_2O_3$ at a loading of about 1.6 weight % Pd. The $Al_2O_3$/Pd material was then dried at 120° C. overnight and, afterwards, calcined at 550° C. for about 5 hours. Next, the $Pd/Al_2O_3$ material was ball milled together with the $La_{0.9}Sr_{0.1}CoO_3$ and formed into a slurry as described before. Monolithic core samples were then dip-coated in the slurry and, afterwards, placed horizontally in an oven set at 200° C. for 30 minutes. This procedure was repeated until the targeted total loading of about 60 g/L Pd(1.6 wt. %)/$Al_2O_3$ and 60 g/L $La_{0.9}Sr_{0.1}CoO_3$ was reached. After this loading was achieved, the replica DOC catalyst material was calcined at 700° C. for 5 hours with an air flow of 100 mL/minute. Palladium particles were then loaded onto the surface of the $La_{0.9}Sr_{0.1}CoO_3$ by a conventional wet impregnation method to form the $Pd/La_{0.9}Sr_{0.1}CoO_3$ as described before. The core samples where then hydrothermally pretreated in an oven at 750° C. with 10 mol % $H_2O$ in air for about 72 hours.

6. Performance Evaluation

A vertical quartz tubular reactor operated at atmospheric pressure was used to evaluate the NO oxidation performance, the HC oxidation performance, and the sulfur tolerance of the various materials included on the core samples just described. The prepared core samples were individually housed in the reactor while an inlet gas line and an outlet gas line delivered a gas feed to and from the reactor, respectively. A reactant gas feed bank was assembled for delivering the gas feed to the reactor at 1.6 L/min corresponding to a space velocity of about 30,000 $h^{-1}$. The reactant gas feed bank, which included a source of $N_2$, $O_2$, NO, $C_3H_6/C_3H_8$, and $SO_2$, was able to emulate a typical lean-burn engine exhaust under a variety of circumstances. A water port was also provided to introduce controllable amounts of water to the gas feed supplied to the reactor through the inlet gas line.

The reactor was heated in a tube furnace to control the temperature of the gas feed just upstream from the core sample to anywhere from about 125° C. to about 450° C. Thermocouples were used to measure the temperature of the gases upstream and downstream of the reactor. The outlet reactor gas flow, moreover, was analyzed with a Fourier Transform Infrared (FTIR) analyzer (ThermoNicolet NEXUS 670) that was calibrated at 940 Torr and 165° C. A pressure controller at the outlet of the FTIR was used to maintain the calibration pressure. Both the inlet gas line and the outlet gas line were maintained at a temperature of about 165° C. to assure than any water present was completely vaporized.

Figure 4:
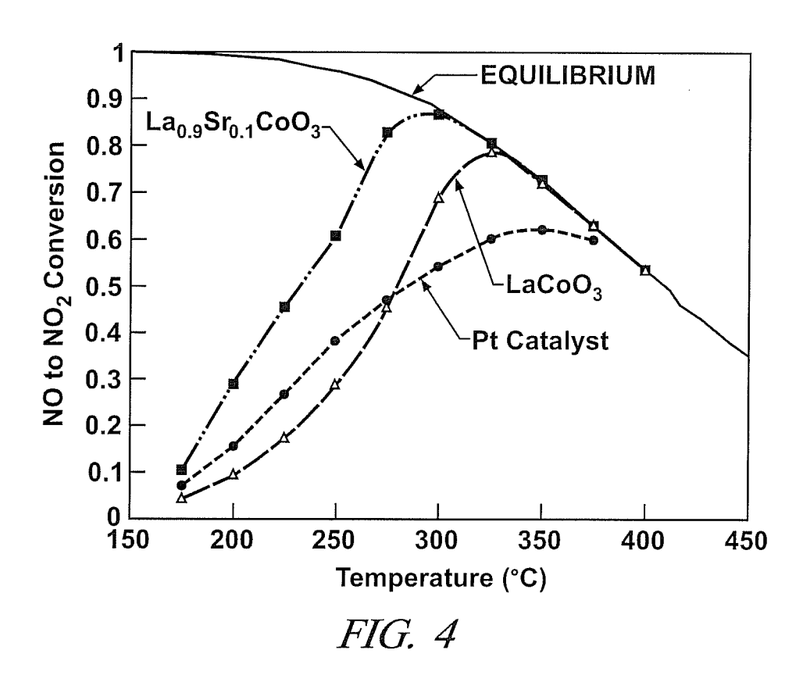
FIG. 4 is a graph that compares the NO oxidation conversion performance of two perovskite oxides, each without supported palladium particles, and a conventional platinum-based DOC catalyst material.

FIG. 4 compares the NO to $NO_2$ conversion performance of the several perovskite compounds without supported palladium particles ($La_{0.9}Sr_{0.1}CoO_3$ and $LaCoO_3$) and the conventional platinum-based DOC catalyst material. A core sample with each material was individually placed in the reactor and evaluated for NO oxidation performance. The feed gas to the reactor contained 10 mol % $O_2$, 500 ppm NO, and the balance $N_2$. As can be seen, both of the $La_{0.9}Sr_{0.1}CoO_3$ and $LaCoO_3$ reached equilibrium for the conversion of NO to $NO_2$ at a lower temperature than the conventional platinum-based DOC oxidation catalyst material. The $La_{0.9}Sr_{0.1}CoO_3$ and $LaCoO_3$ also generally showed a comparable or superior NO oxidation efficiency than the conventional platinum-based DOC catalyst material over the temperature range tested.

Figure 5:
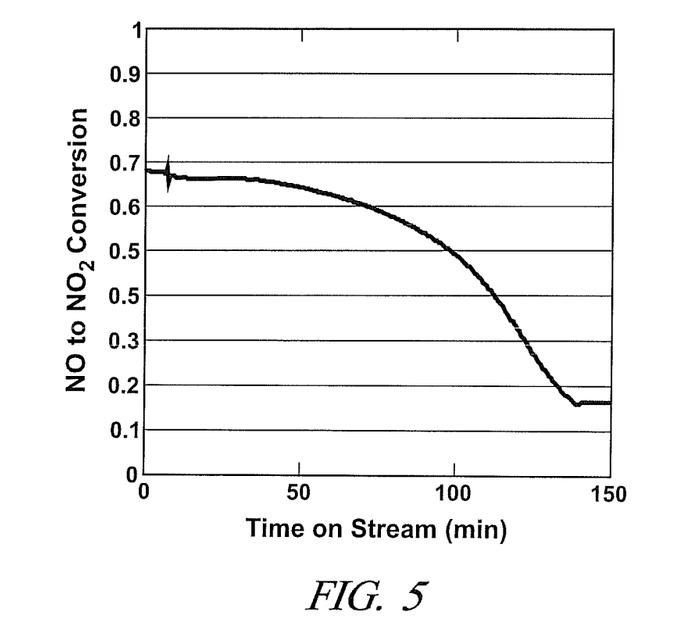
FIG. 5 is a graph that demonstrates the NO oxidation performance of a perovskite oxide, without supported palladium particles, when exposed to a simulated exhaust from a lean-burn engine that is combusting a sulfur-containing fuel.
Figure 6:
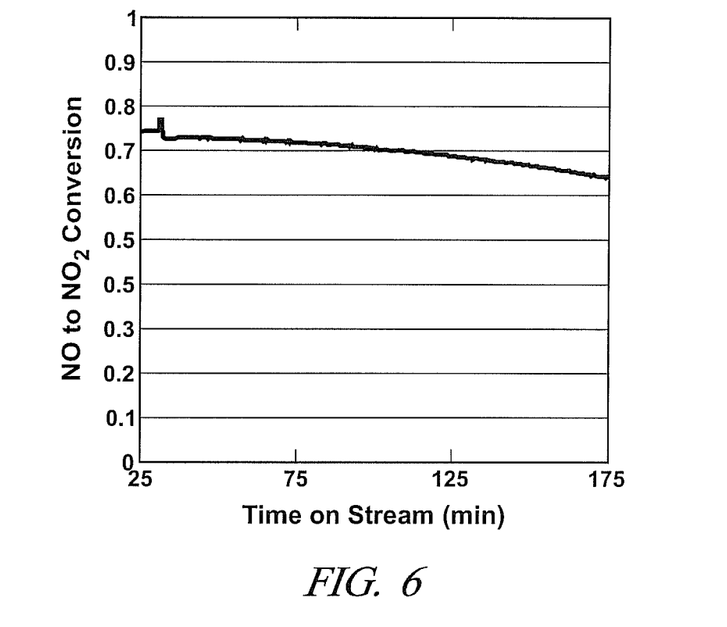
FIG. 6 is a graph that demonstrates the NO oxidation performance of the oxidation catalyst, according to one embodiment of the invention, when exposed to a simulated exhaust from a lean-burn engine that is combusting a sulfur-containing fuel.

FIGS. 5 and 6 compare the effect that the palladium support particles have on the sulfur tolerance of the $Pd/La_{0.9}Sr_{0.1}CoO_3$. A core sample that included the $La_{0.9}Sr_{0.1}CoO_3$ and a core sample that included the $Pd/La_{0.9}Sr_{0.1}CoO_3$ were each individually placed in the reactor and evaluated for sulfur tolerance. The feed gas to the reactor comprised 8 mol % $O_2$, 8 mol % $H_2O$, 200 ppm NO, 260 ppm $C_3H_6$, 90 Ppm $C_3H_8$, 1 ppm $SO_2$, and the balance $N_2$. The feed gas was maintained at 300° C. and delivered to the reactor for a period of up to 175 minutes. The NO conversion of the core sample that contained $La_{0.9}Sr_{0.1}CoO_3$, shown in FIG. 5, steadily declined from about 0.65 to less than 0.20 beginning at approximately 50 minutes and ending around 140 minutes. But the NO conversion of the core sample that contained the $Pd/La_{0.9}Sr_{0.1}CoO_3$, shown in FIG. 6, declined only slightly from just above 0.70 to just below 0.70 over the entire time period of 175 minutes. The presence of supported palladium particles thus prevented the degree of sulfur poisoning observed in FIG. 5 and helped maintain the NO oxidation activity of the $Pd/La_{0.9}Sr_{0.1}CoO_3$.

Figure 7:
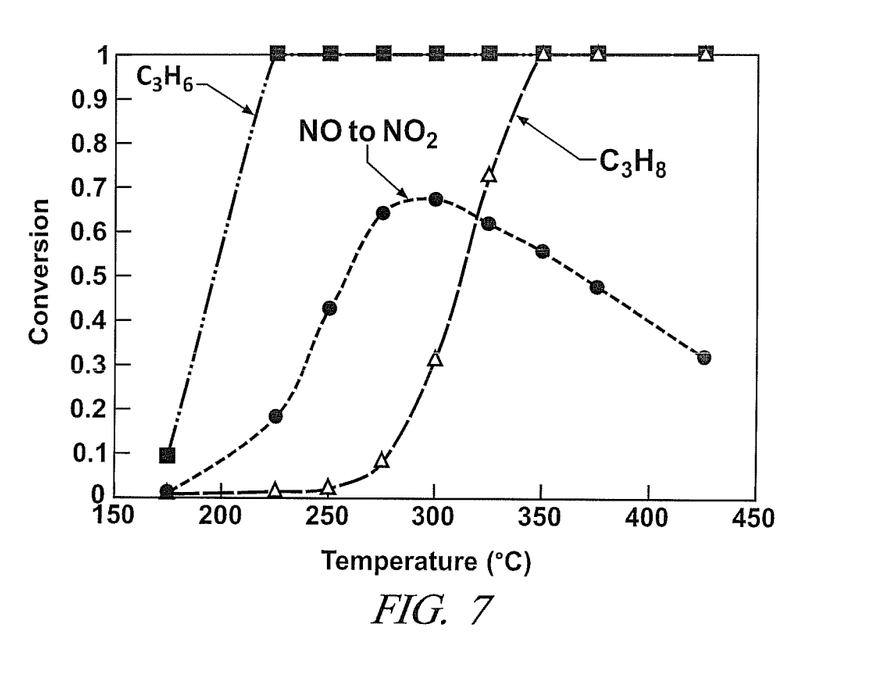
FIG. 7 is a graph that demonstrates the NO, $C_3H_6$, and $C_3H_8$ oxidation performance of a replica DOC catalyst material that includes the oxidation catalyst, according to one embodiment of the invention, when exposed to a simulated exhaust from a lean-burn engine that is combusting a fuel that does not contain sulfur.
Figure 8:
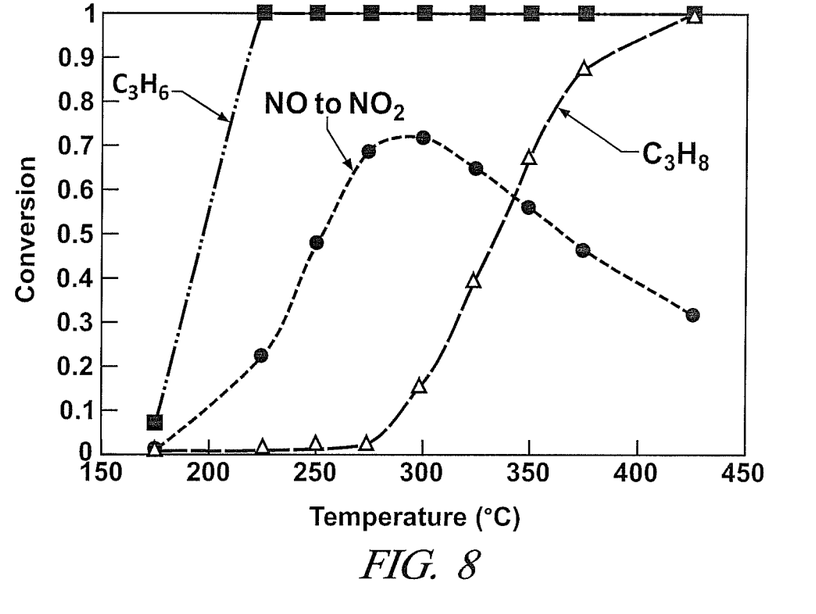
FIG. 8 is a graph that demonstrates the NO, $C_3H_6$, and $C_3H_8$ oxidation performance of a replica DOC catalyst material that includes the oxidation catalyst, according to one embodiment of the invention, after being exposed to a simulated exhaust from a lean-burn engine that is combusting a sulfur-containing fuel.

FIGS. 7 and 8 demonstrate the NO and HC oxidation performance, after significant exposure to $SO_2$, of the replica DOC catalyst material that includes the $Pd/La_{0.9}Sr_{0.1}CoO_3$ dispersed on the $Al_2O_3$ carrier material with free standing palladium. First, a core sample that contained the replica DOC catalyst material was placed in the reactor and evaluated for NO and HC oxidation performance in the absence of $SO_2$. The feed gas supplied to the reactor contained 8 mol % $O_2$, 8 mol % $H_2O$, 200 ppm NO, 245 ppm $C_3H_6$, 90 ppm $C_3H_8$, and the balance $N_2$. The observed oxidation of the $C_3H_6$, the $C_3H_8$, and the NO with increasing feed gas temperature is shown in FIG. 7. Next, 1 ppm of $SO_2$ was introduced into the feed gas and delivered to the reactor for 16 hours to expose the $Pd/La_{0.9}Sr_{0.1}CoO_3$ to a total of 1 gram of sulfur. The $C_3H_6$, the $C_3H_8$, and the NO oxidation performance of the replica DOC catalyst material, shown in FIG. 8, was then evaluated in the same manner as before. A comparison of the data in FIGS. 7 and 8 reveals that the replica DOC catalyst material having the $Pd/La_{0.9}Sr_{0.1}CoO_3$ dispersed on the $Al_2O_3$ carrier material with free standing palladium experienced very little NO or HC catalytic deactivation after the sulfur exposure.

Figure 9:
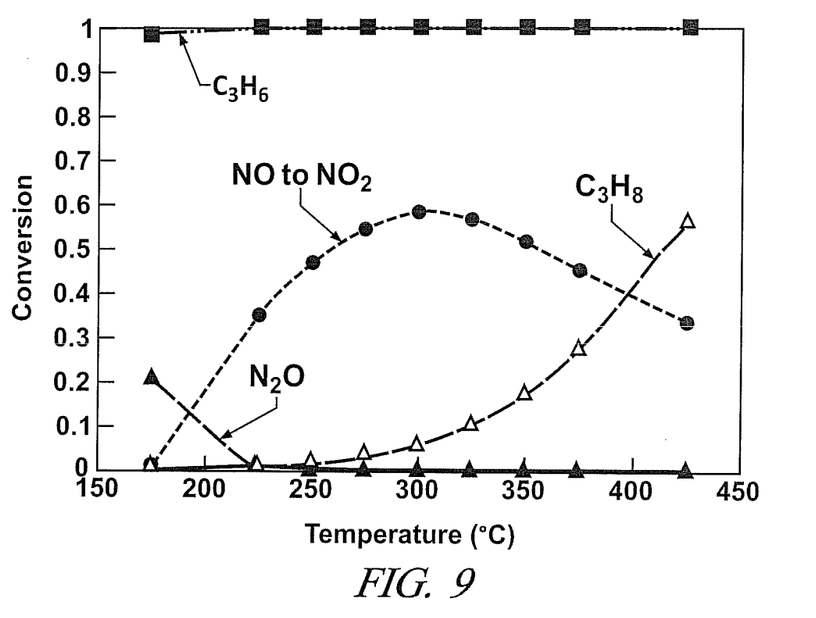
FIG. 9 is a graph that demonstrates the NO, $C_3H_6$, and $C_3H_8$ oxidation performance of a conventional platinum-based DOC catalyst material when exposed to a simulated exhaust from a lean-burn engine that is combusting a fuel that does not contain sulfur.
Figure 10:
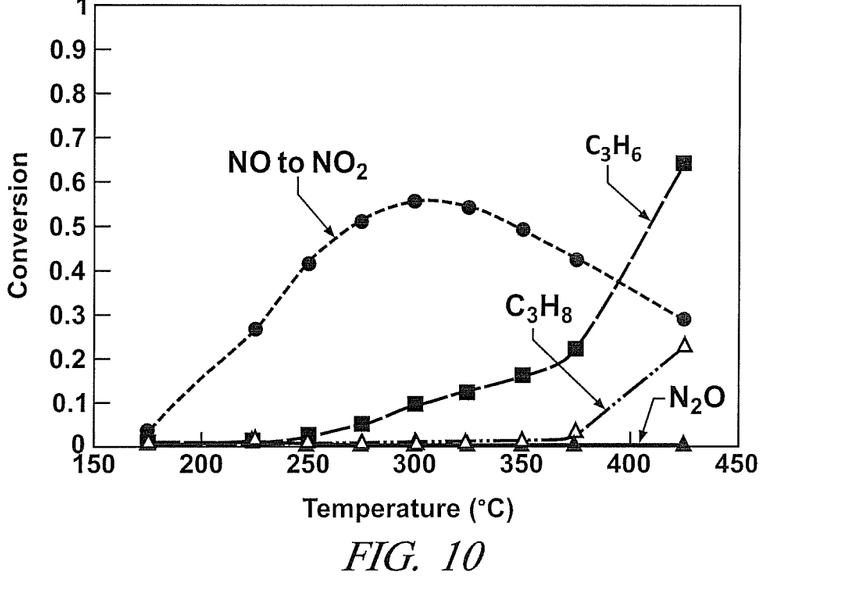
FIG. 10 is a graph that demonstrates the NO, $C_3H_6$, and $C_3H_8$ oxidation performance of a perovskite oxide, without supported palladium particles, when exposed to a simulated exhaust from a lean-burn engine that is combusting a fuel that does not contain sulfur.
Figure 11:
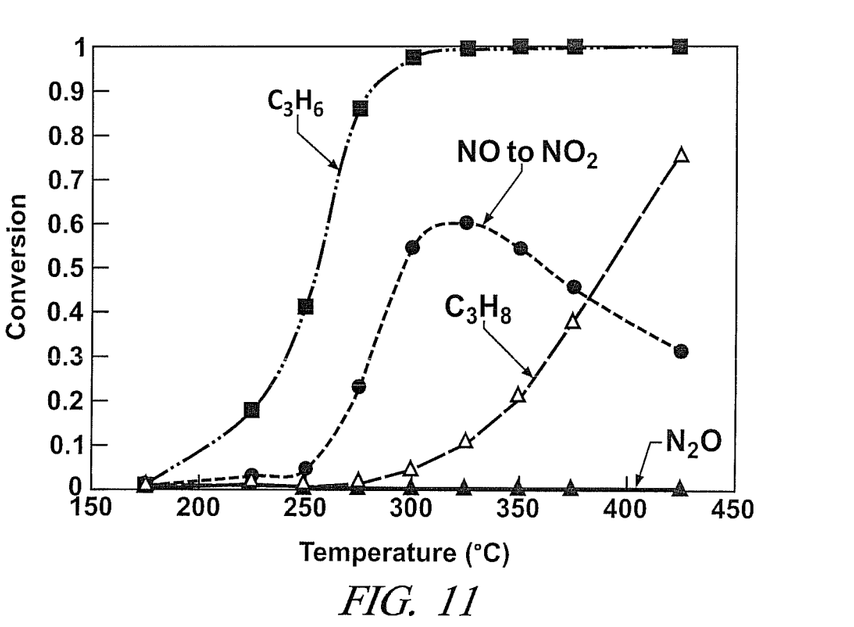
FIG. 11 is a graph that demonstrates the NO, $C_3H_6$, and $C_3H_8$ oxidation performance of the oxidation catalyst, according to one embodiment of the invention, when exposed to a simulated exhaust from a lean-burn engine that is combusting a fuel that does not contain sulfur.
Figure 12:
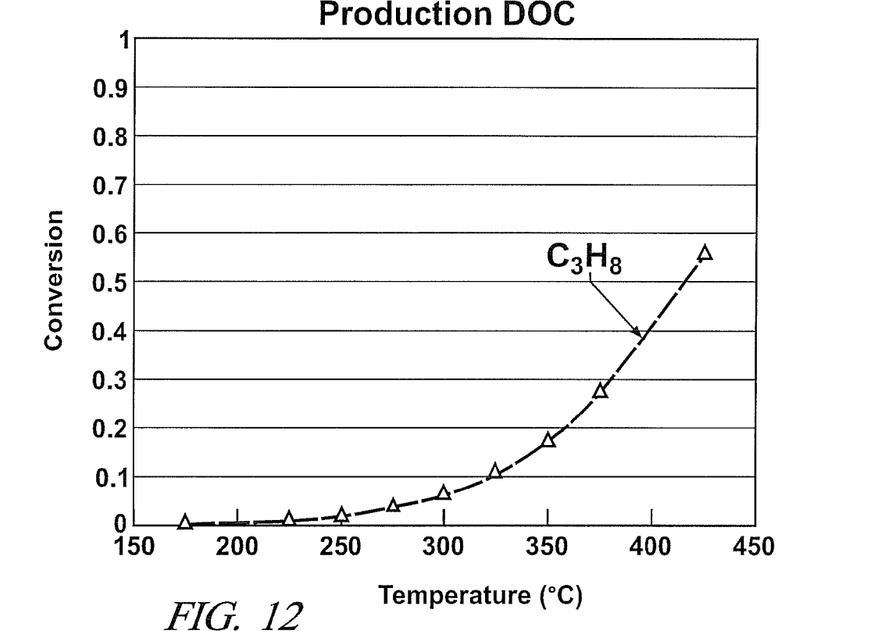
FIG. 12 is a graph that shows only the $C_3H_8$ oxidation performance of the conventional platinum-based DOC catalyst material shown in FIG. 9.
Figure 13:
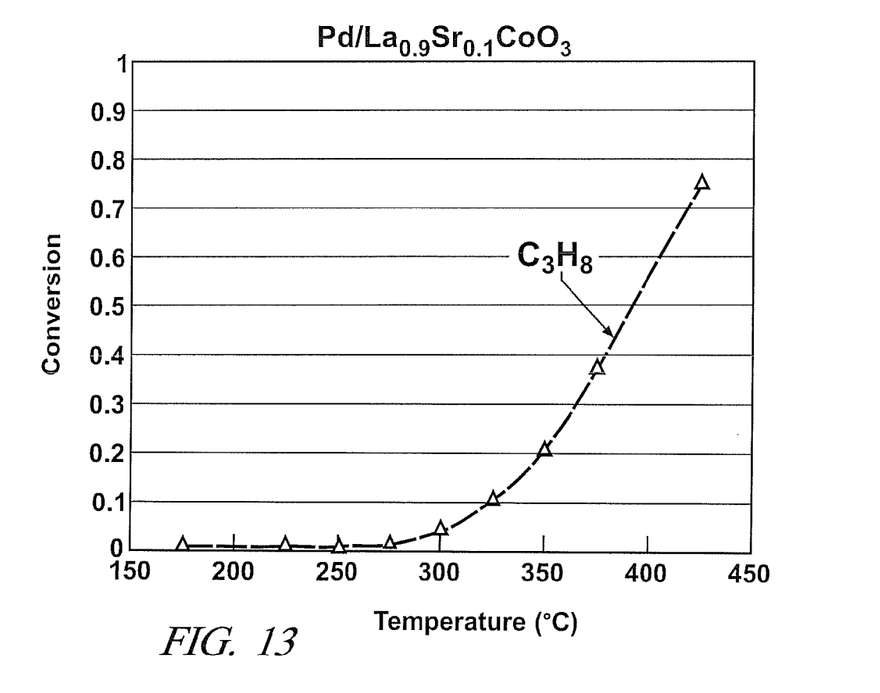
FIG. 13 is a graph that shows only the $C_3H_8$ oxidation performance of the oxidation catalyst shown in FIG. 11.

FIGS. 9-13 compare the HC oxidation performance of the conventional platinum-based DOC catalyst material, $La_{0.9}Sr_{0.1}CoO_3$, and the $Pd/La_{0.9}Sr_{0.1}CoO_3$. Core samples with the conventional platinum-based DOC oxidation catalyst, the $La_{0.9}Sr_{0.1}CoO_3$, and the $Pd/La_{0.9}Sr_{0.1}CoO_3$ were each individually placed in the reactor and evaluated for HC oxidation performance. The feed gas to the reactor contained 8 mol % $O_2$, 8 mol % $H_2O$, 200 ppm NO, 260 ppm $C_3H_6$, 90 ppm $C_3H_8$, and the balance $N_2$. The HC oxidation performance of the conventional platinum-based DOC catalyst material is shown in FIG. 9. The HC oxidation performance of the $La_{0.9}Sr_{0.1}CoO_3$, on the other hand, is shown in FIG. 10. The $La_{0.9}Sr_{0.1}CoO_3$ alone, without supported palladium particles, somewhat struggled to match the HC oxidation performance of the conventional platinum-based DOC catalyst material as indicated by a comparison of FIGS. 9 and 10. But the HC oxidation performance of the $Pd/La_{0.9}Sr_{0.1}CoO_3$, shown in FIG. 11, compared favorably to and in some aspects exceeded that of the conventional platinum-based DOC catalyst material. The $Pd/La_{0.9}Sr_{0.1}CoO_3$ showed superior $C_3H_8$ oxidation performance as compared to the conventional platinum-based DOC catalyst material. This can be seen by comparing FIGS. 9 and 11 or, more simply, by referring to FIGS. 12-13 which isolate and show only the $C_3H_8$ oxidation performance of the conventional platinum-based DOC catalyst material and the $Pd/La_{0.9}Sr_{0.1}CoO_3$, respectively. The $C_3H_6$ oxidation performance of the $Pd/La_{0.9}Sr_{0.1}CoO_3$, albeit slightly less favorable than that of the conventional platinum-based DOC catalyst material, is still much better than the $C_3H_6$ oxidation performance observed for the $La_{0.9}Sr_{0.1}CoO_3$.

The above description of embodiments is merely exemplary in nature and, thus, variations thereof are not to be regarded as a departure from the spirit and scope of the invention.

What is claimed is:

1. An oxidation catalyst for use in a component of an exhaust aftertreatment system where at least NO contained in an exhaust emitted from a lean-burn engine is oxidized, the oxidation catalyst comprising:
    perovskite oxide particles;
    palladium particles supported on the perovskite oxide particles at a weight percent ranging from about 0.5 to about 5.0 based on the weight of the oxidation catalyst; and wherein said perovskite oxide particles comprise at least one of $La_{0.9}Sr_{0.1}CoO_3$ or $La_{0.9}Sr_{0.1}MnO_3$.

2. The oxidation catalyst according to claim 1, wherein the perovskite oxide particles Farther comprise at least one of $LaCoO_3$ or $LaMnO_3$.

3. The oxidation catalyst according to claim 1, wherein the palladium particles are supported on the perovskite oxide particles at a weight percent ranging from about 1.0 to about 2.0 based on the weight of the oxidation catalyst.

4. The oxidation catalyst according to claim 1. wherein the component of the exhaust aftertreatment system is a diesel oxidation catalyst.

5. The oxidation catalyst according to claim 1, wherein the component of the exhaust aftertreatment system is a lean $NO_X$ trap.

6. An exhaust aftertreatment system that receives an engine exhaust emitted from a lean-burn engine that is combusting a lean mixture of air and fuel, comprising:
   a component comprising;
   a substrate surface over which at least a portion of the engine exhaust passes; and
   an oxidation catalyst carried by the substrate that comprises perovskite oxide particles and palladium particles supported on the perovskite oxide particles, wherein the palladium particles are supported on the perovskite oxide particles at a weight percent ranging from about 0.5 to about 5.0 based on the weight of the oxidation catalyst:
   wherein said perovskite oxide particles comprise at least one of $La_{0.9}Sr_{0.1}CoO_3$ or $La_{0.9}Sr_{0.1}MnO_3$.

7. The exhaust aftertreatment system according to claim 6, wherein the perovskite oxide particles further comprise at least one of $LaCoO_3$ or $LaMnO_3$.

8. The exhaust aftertreatment system according to claim 6, wherein the palladium particles are supported on the perovskite oxide particles at a weight percent ranging from about 1.0 to about 2.0 based on the weight of the oxidation catalyst.

9. The exhaust aftertreatment system according to claim 6, wherein the component is a diesel oxidation catalyst.

10. The exhaust aftertreatment system according to claim 6, wherein the component is a lean $NO_X$ trap.

11. The exhaust aftertreatment system according to claim 6, further comprising free-standing palladium particles, which are not supported by the perovskite oxide particles, carried by the substrate surface.

12. The exhaust aftertreatment system according to claim 6, wherein the oxidation catalyst has no platinum.

13. The exhaust aftertreatment system according to claim 6, wherein the oxidation catalyst is directly applied to the substrate surface.

14. The exhaust aftertreatment system according to claim 6, further comprising a carrier material carried by the substrate surface, wherein the carrier material has a surface area that ranges from about 20 $m^2$/gram to about 300 $m^2$/gram, wherein the carrier material comprises at least one of a mixed cerium and zirconium oxide material ($CeO_2$—$ZrO_2$), alumina ($Al_2O_3$), a zeolite, or a combination of one or more of those materials, and wherein the oxidation catalyst is dispersed on the carrier material.

15. The exhaust aftertreatment system according to claim 6, wherein the oxidation catalyst material comprises $La_{0.9}Sr_{0.1}CoO_3$ particles and palladium particles supported on the $La_{0.9}Sr_{0.1}CoO_3$ particles, and wherein the palladium particles are supported on the $La_{0.9}Sr_{0.1}CoO_3$ particles at a weight percent of about 1.5 based on the weight of the oxidation catalyst.

16. The exhaust aftertreatment system according to claim 6, wherein the oxidation catalyst material comprises $La_{0.9}Sr_{0.1}MnO_3$ particles and palladium particles supported on the $La_{0.9}Sr_{0.1}MnO_3$ particles, and wherein the palladium particles are supported on the $La_{0.9}Sr_{0.1}MnO_3$ particles at a weight percent of about 1.5 based on the weight of the oxidation catalyst.

17. The exhaust aftertreatment system according to claim 6, wherein the oxidation catalyst is carried by the substrate material in an amount that ranges from about 50 to 200 grams per liter of volume through which the engine exhaust flows in the presence of the oxidation catalyst.

18. An exhaust aftertreatment system that receives an engine exhaust emitted from a lean-hum engine that is combusting a lean mixture of air and fuel, comprising:
   a component comprising:
   a substrate surface over which at least a portion of the engine exhaust passes; and
   an oxidation catalyst material comprising $La_{0.9}Sr_{0.1}CoO_3$ particles and palladium particles supported on the $La_{0.9}Sr_{0.1}CoO_3$ particles, and wherein palladium particles are supported on the $La_{0.9}Sr_{0.1}CoO_3$ particles at a weight percent of about 1.5 based on the weight of the oxidation catalyst.

19. An exhaust aftertreatment system that receives an engine exhaust emitted from a lean-bum engine that is combusting a lean mixture of air and fuel, comprising:
   a component comprising;
   a substrate surface over which at least a portion of the engine exhaust passes; and
   an oxidation catalyst material comprising $La_{0.9}Sr_{0.1}MnO_3$ particles and palladium particles supported on the $La_{0.9}Sr_{0.1}MnO_3$ particles, and wherein palladium particles are supported on the $La_{0.9}Sr_{0.1}MnO_3$ particles at a weight percent of about 1.5 based on the weight of the oxidation catalyst.

\* \* \* \* \*